US006424632B1

(12) United States Patent
Poret et al.

(10) Patent No.: US 6,424,632 B1
(45) Date of Patent: Jul. 23, 2002

(54) METHOD AND APPARATUS FOR TESTING PACKET DATA INTEGRITY USING DATA CHECK FIELD

(75) Inventors: Michel Poret, Gattieres; Rene Glaise, Nice, both of (FR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/238,879

(22) Filed: Jan. 27, 1999

(30) Foreign Application Priority Data

Sep. 16, 1998 (EP) .............................................. 98480065

(51) Int. Cl.[7] .............................................. H04L 12/54
(52) U.S. Cl. ...................................... 370/252; 370/395
(58) Field of Search .............................. 370/395.1, 389, 370/252, 428, 429, 412, 465, 463; 714/748, 756

(56) References Cited

U.S. PATENT DOCUMENTS

| 5,251,215 A | * 10/1993 | Dravida et al. ............. 370/471 |
| 5,260,936 A | * 11/1993 | Bardet et al. ............... 370/428 |
| 5,768,274 A | 6/1998 | Marakami et al. .......... 370/395 |
| 5,912,881 A | * 6/1999 | Glaise et al. ............... 370/252 |
| 5,940,375 A | * 8/1999 | Soumiya et al. ............ 370/249 |
| 6,014,707 A | * 7/2000 | Glaise ....................... 714/776 |

OTHER PUBLICATIONS

Glaise R: IBM J. Res. Dev vol. 41, No. 6, Nov. 1997, pp. 705–709, XP002094272 usa *the whole document*.
Glaise R. et al: Proc. IEEE Int. Conf. On Computer Design, Oct. 1993 pp. 602–605, XP002094273 usa *the whle document*.

* cited by examiner

Primary Examiner—Douglas Olms
Assistant Examiner—Ken Vanderpuye
(74) Attorney, Agent, or Firm—J. Bruce Schelkopf

(57) ABSTRACT

A single check field can be generated and appended to packets prior to a switching or other operation to support post-operation verification that protected fields were not altered during the operation and that the post-operation packet sequence matches the pre-operation packet sequence. The check field requires the use of nominally-synchronized packet counters at the check field generating system and at the verification system. The check field is generated by performing a CRC calculation on the protected fields of the packet. The CRC result is combined with the current packet count to obtain the final check field, which is appended to the packet. At the verification system, a CRC calculation is performed on the protected fields of the packet, included the appended final check field. This provides an interim check result which is compared to the current packet count at the verification system. A non-null compare result is indicative of an error condition. The type of error condition can be established by comparing verification results for successive packets.

9 Claims, 4 Drawing Sheets

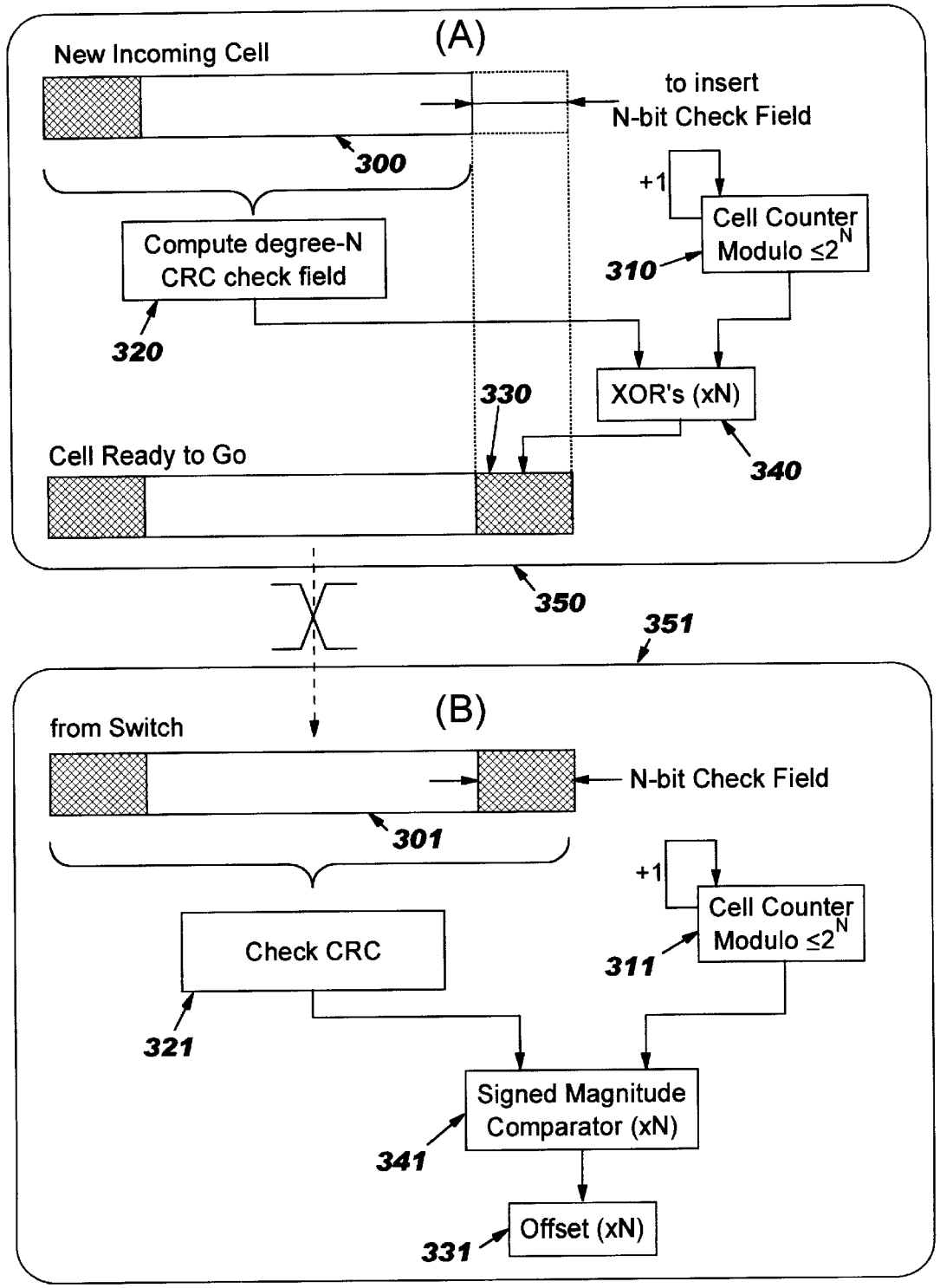

FIG. 4

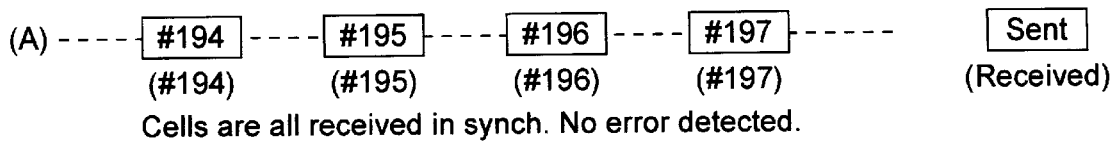

Cells are all received in synch. No error detected.

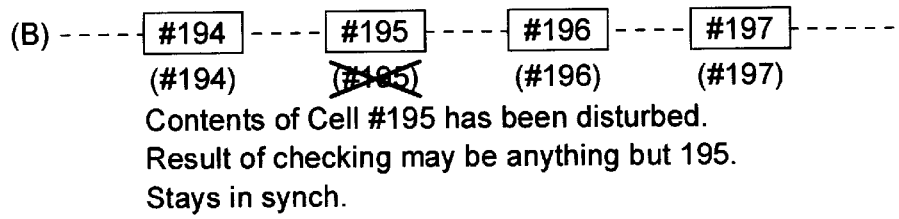

Contents of Cell #195 has been disturbed.
Result of checking may be anything but 195.
Stays in synch.

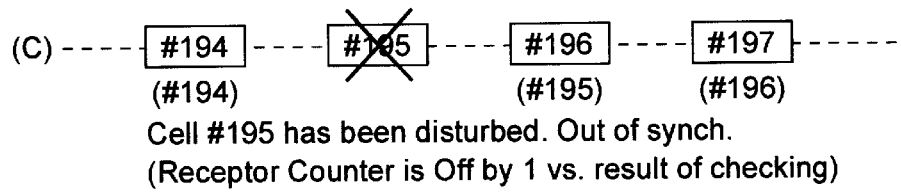

Cell #195 has been disturbed. Out of synch.
(Receptor Counter is Off by 1 vs. result of checking)

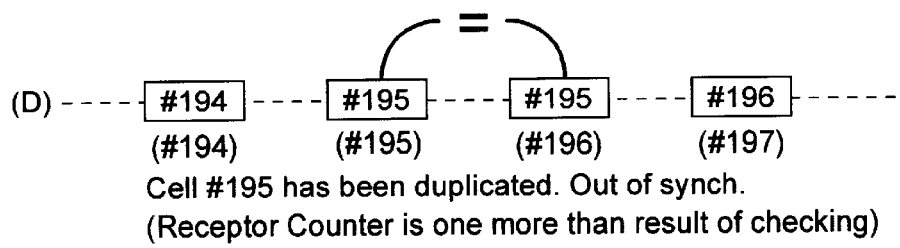

Cell #195 has been duplicated. Out of synch.
(Receptor Counter is one more than result of checking)

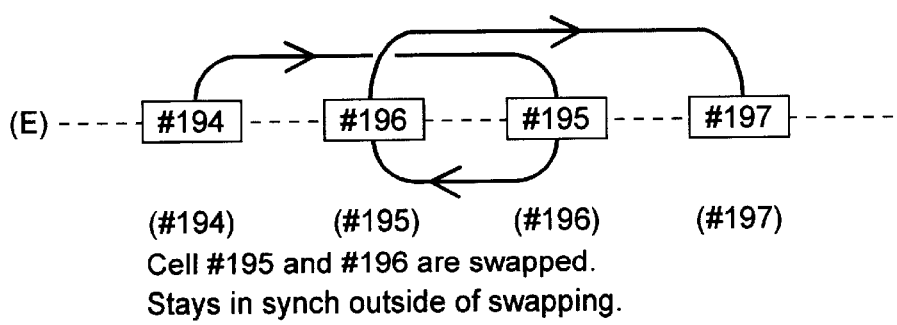

Cell #195 and #196 are swapped.
Stays in synch outside of swapping.

METHOD AND APPARATUS FOR TESTING PACKET DATA INTEGRITY USING DATA CHECK FIELD

FIELD OF THE INVENTION

This invention relates to communication networks and, more particularly, to a method for testing the integrity of packet data using a single data check field which supports tests for changes in packet contents and ordering following a switching or transfer operation.

BACKGROUND ART

Very high rate data communication networks are becoming increasingly common, due in part to the deployment of optical fibers capable of transmitting data at extremely high rates. Switching of fixed-length packets (cells) at network nodes is recognized as one of the best ways to take advantage of the potential performance offered by such fibers. Nodes or systems on the network are connected via one or more switches which route the cells to their various destinations. The term "switch" is ordinarily used to refer to a system which includes input and output adapters with buffering capabilities and a switching fabric which performs the actual switching of cells from an input adapter to the appropriate output adapter.

Switches are interconnected through inbound and outbound communication links. Links, while logically separate, are paired such that one inbound and one outbound connection form a full-duplex link tied to a switch port. Cells are received from an inbound link by the switch and retransmitted on one of the outbound links according to the routing rules of the protocol in use within the network; for instance, Asynchronous Transfer Mode (ATM).

The core of the switching process, as it is defined for ATM, is as follows. A header in a cell received on an inbound link is examined to identify the outbound link on which it must be forwarded. The contents of the header are typically changed in the switch to new values needed for switching of the cell at the next system on its path; that is, the switch at the remote end of the outbound link. The cell is transmitted towards its destination on the selected outbound link. During this process the system is constrained to deliver cells to the appropriate output port for the selected outbound link in the same sequence as the cells arrive at the switch.

The same physical link normally carries multiple logical or virtual connections between switches. The switching process described above is applied for each virtual connection carried on the same physical link.

For the sake of simplicity and to accommodate different applications, the route of a cell through the switching fabric is preferably specified by a routing vector or tag prefixed to the cell itself. The routing tag is added at the input adapter processing the cell and is used by the switching fabric to select the output adapter or adapters (in case of multicasting) to which the cell is to be directed. To guarantee cell data integrity during a switching operation, an input adapter conventionally generates a check field value based only on the cell contents and appends the check field to the cell. The output port adapter receiving the cell employs the check field and known error detection techniques to verify that the contents of the cell have not changed during the switching operation. Normally, the check field is generated using a standard Cyclic Redundancy Check (CRC) algorithm.

Each output adapter receiving the switched cell removes the routing tag and the check field before the cell is transmitted toward the next switch on a virtual connection.

More information on ATM technology is available in "Asynchronous Transfer Mode (ATM), Technical Overview" a publication by the IBM International Technical Support Organization, reference SG24-4625, dated October 1995.

The process described above can be used to detect permanent and/or intermittent hardware or software problems in a switching fabric, permitting the switch to be isolated for maintenance and repair. In redundant systems, a failing switch may be automatically deactivated with switching operations being transferred to a parallel active switch to provide an interruption-free mode of operation. Interruption-free or fail-safe operation is often a requirement for communication networks that are assumed to operate 24 hours a day.

In most communication networks, the amount of data traffic extant at any particular point in the network can increase abruptly as the number of sources providing data increases and/or as existing sources increase the amount of data they are supplying. Consequently, congestion may occur almost anywhere in a network. The response of a switch to congestion is dependent on its design. However, a common response is that one or more cells are dropped or discarded because internal queues or buffers overflow. Also, because of design flaws in the hardware or software which controls a switch, cells may get out of sequence during switching.

The fact that one or more cells have been dropped or are out of sequence is not detected by normal error checking using a conventional CRC check field because the check field value is generated solely as a function of the contents of the particular cell to which it is appended. Missing or out-of-sequence cells typically must be detected by higher-layer processes performed only at the endpoints of a source-to-destination path. Known higher-layer processes do not locate the source of a failure which can occur at any of the several nodes along the source-to-destination path.

The traditional way of handling the detection of dropped or out-of-sequence cells is to include a sequence number in every cell. The obvious drawback of this method is that an extra field must be allocated in the cell to transport the sequence number information. An example of the use of an extra field is the Adaptation Layer 1 of ATM (also described in the "Technical Overview" previously mentioned) which deals with the transport of constant-bit-rate traffic such as digitized voice. The specification for Adaptation Layer 1 solves the problem of having to insert a sequence number into each cells by borrowing a byte from the cell data payload. This necessarily reduces the available data payload from its regular 48-byte format to a non-standard 47-byte useful payload, which complicates data manipulation in the temporary buffers and queues generally found in switch adapters.

In the general case, data originally formatted using protocols than ATM may need to be handled in a cell-based communication network. As a consequence, cells being processed in a switch may be the result of the segmentation of messages received by the input adapter. In such cases it is important to preserve cell sequencing so as to permit a proper re-assembling of messages in the switch's output adapter or at a final destination.

It is a first object of the invention to provide a method for generating a data check field to be appended to a packet being processed in a network, the check field being usable for detecting alterations in packet contents as packet sequencing problems. It is a second object of the invention to achieve this dual detection capability with a minimum check field length while maintaining all detection capabilities of a CRC check field.

SUMMARY OF THE INVENTION

The invention can be implemented as a method for generating a check field to be appended to packets to be processed in a data communications network. The method comprises the following steps. A regular CRC calculation is performed for the packet fields to be protected, yielding an initial value for a check field. A packet connection counter is incremented for each new processed packet. The number of output stages in the counter is less than or equal to the degree of the generator polynomial used to compute the CRC. The initial value of the check field is modified by exclusively OR'ing the current counter outputs with the initial (CRC) value, producing a final value for the check field. The final value of the check field is appended to the packet.

A check field generated in the manner described above can be tested to in an output adapter to test for changes in the protected fields and/or packet sequencing problems resulting from switching or other packet transfer operations. The test method comprises the steps of performing a CRC calculation for the protected fields of the packet, including the appended check field, yielding a partial check result. An outbound packet connection counter is incremented for each new outbound packet. on the selected connection. Like the counter used for the check field generation process, the outbound packet counter has a number of stages less than or equal to the degree of the polynomial used to compute the CRC. The CRC calculation or partial check result is compared to the current count, which may or may not result in a non-null value. A null value indicates that the cell contents did not change during processing through the switching fabric and that all packets have been received in the right sequence. A non-null value indicates an error of some kind.

The present invention converts a regular CRC field into a composite check field which permits detection of changes within the protected fields. The composite check field additionally supports detection of packet sequencing problems when the calculations are performed on successive packets.

BRIEF DESCRIPTION OF THE DRAWINGS

FIG. 3 illustrates the logical blocks of apparatus for both generating a composite check field in accordance with the invention and for testing a cell including such a check field for the presence of error conditions.

FIG. 4 shows several cell switching scenarios which may result in errors that can be detected by the output adapter.

DETAILED DESCRIPTION OF THE PREFERRED EMBODIMENT

Although details of a preferred embodiment of the invention are described in the context of high-speed cell switches deployed at nodes of high performance fixed-length cell networks, such as Asynchronous Transfer Mode networks, the methods and apparatus of the invention also apply to other kinds of networks. The method for generating and checking may be implemented at the endpoints of any segment of a selected path in a network. The methods could, for example, be implemented in the input and output adapters of an ATM switch or even at the source and destination of a multi-node frame relay connection or in any other network environment in which there intended to be no change in protected cell/packet contents and no change in packet/cell sequencing at any point between generation of the check field and subsequent use of the check field for error testing.

Figure 1:
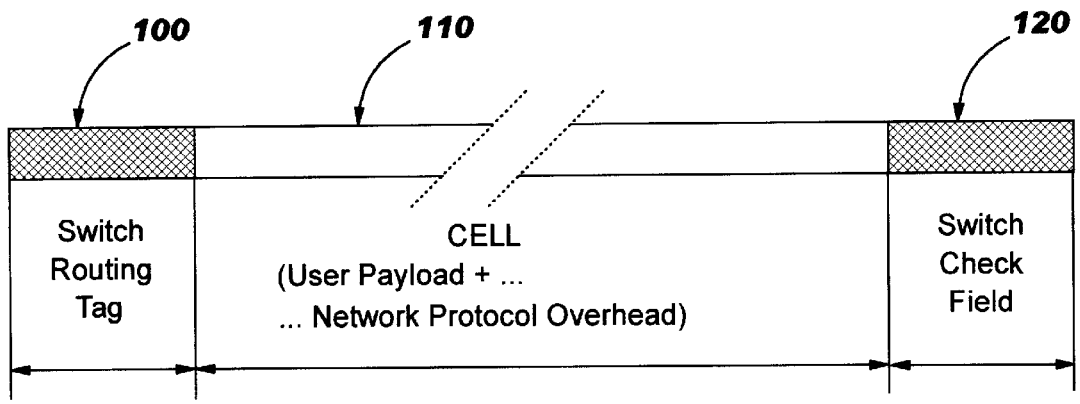
FIG. 1 depicts a cell having a routing tag and a check field appended for transmission through a cell switching fabric of the type that may be found in an ATM system.

FIG. 1 depicts a cell 110 that has been formatted by the input adapter for a cell-switching fabric as might be found in an ATM environment. A routing tag 100 prefixed to the cell allows the cell to be steered towards the correct switch output port. A switch check field 120, generated in accordance with the present invention, is appended to the cell in order to detect possible cell alterations and cell sequencing violations. The check field calculation may or not encompass the routing tag itself depending on whether the routing tag is intended to be altered in the course of the switching process. If the routing tag is intended to be altered, it is not included in the fields to which the calculation applies.

Figure 2:
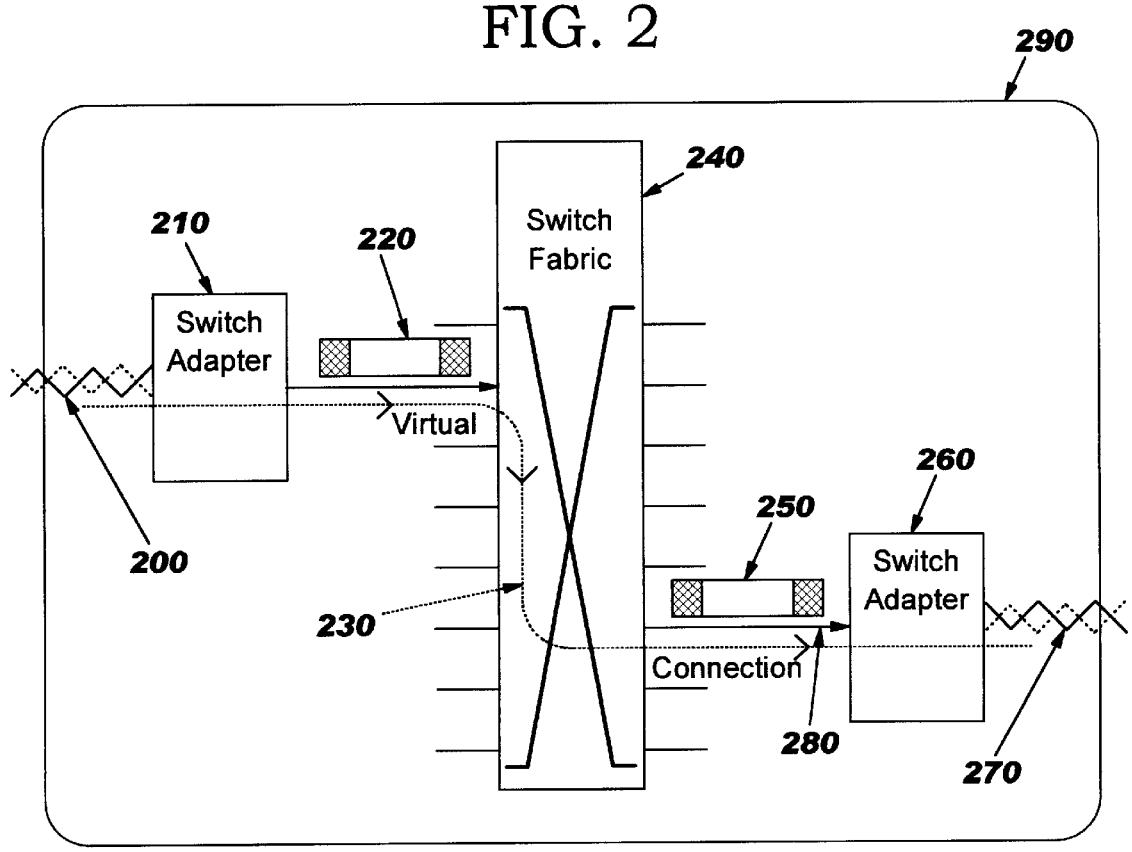
FIG. 2 depicts a switching fabric establishing a virtual connection between an inbound and outbound link.

FIG. 2 illustrates a node in a communications network providing a virtual connection 230 from an inbound link 200 through input switch adapter 210, switch fabric 240 and output switch adapter 260 to outbound link 270. Cells transported over this virtual connection are checked and eventually sent over outbound link 270 after the corresponding link transport protocol has been accommodated by the adapter.

FIG. 3 shows, in an area A, logical block representations of an apparatus suitable for generating the check field to be appended to each cell in an ordered, but unnumbered, series of cells to be transported over the same virtual connection. The same Figure shows, in an area B, logical block representations of apparatus for testing a generated check field in accordance with the invention to detect post-switching alterations or cell sequencing problems.

Each incoming cell, after having been prefixed with a routing tag, is temporarily stored in a storage element 300. A regular Cyclic Redundancy Check (CRC) calculation is then performed by a conventional CRC generator 320. As noted earlier, the CRC calculation always takes the cell contents into account and may take the prefixed routing tag into account if the routing tag is not intended to be changed during the switching process.

Each time a new cell is processed, for a given virtual connection, a cell counter 310 is incremented. The counter has a number of output stages less than or equal to the degree of the CRC generator polynomial. The current count is added, using an Exclusive OR operation, to the output of CRC generator 320. The result of the modulo addition, temporarily stored in register 330, is the final value of the check field which, when appended to cell stored in 300, completes cell formatting required in advance of processing by the switch fabric. Since the number of counter stages is less than or equal to the degree of the CRC generator polynomial, the degree of the final value must be equal to or less than the degree of the generator polynomial.

Each cell delivered by the switching fabric to an output adapter triggers an incrementing operation in a outbound cell counter 311 allocated to the virtual connection on which the cell is being transported. The delivered cell is also temporarily stored in a storage element 301. A conventional CRC calculation is performed on the temporarily-stored cell by a CRC generator 321 of a type known of the art. The CRC calculation provides a partial check result which is compared with the current value of the outbound cell counter 311 in a signed comparator element 341. The output of signed comparator element 341 is an value, which may or may not be a null value, stored in an offset register 331. If the offset value is anything other than a null value, an error is indicated. The error can be further analyzed when additional cells are received for the current virtual connection.

FIG. 4 depicts five scenarios, which can occur at an output adapter handling cells having check fields generated in the manner described above. The five scenarios are basic ones from which others more complex scenarios can be constructed. In each of the illustrations, each cell received in an input adapter for a particular virtual connection is identified by a #NNN legend within a rectangle. When a cell has been processed through the switching fabric and received in an output adapter, it is identified by a #NNN legend directly below a rectangle. If the data structure of a cell in an output adapter matches the data structure of the same cell while that cell was in the input adapter, the vertically aligned #NNN legends are identical. A cell error of some kind is indicated by a mismatch in vertically aligned legends.

Figure 5:
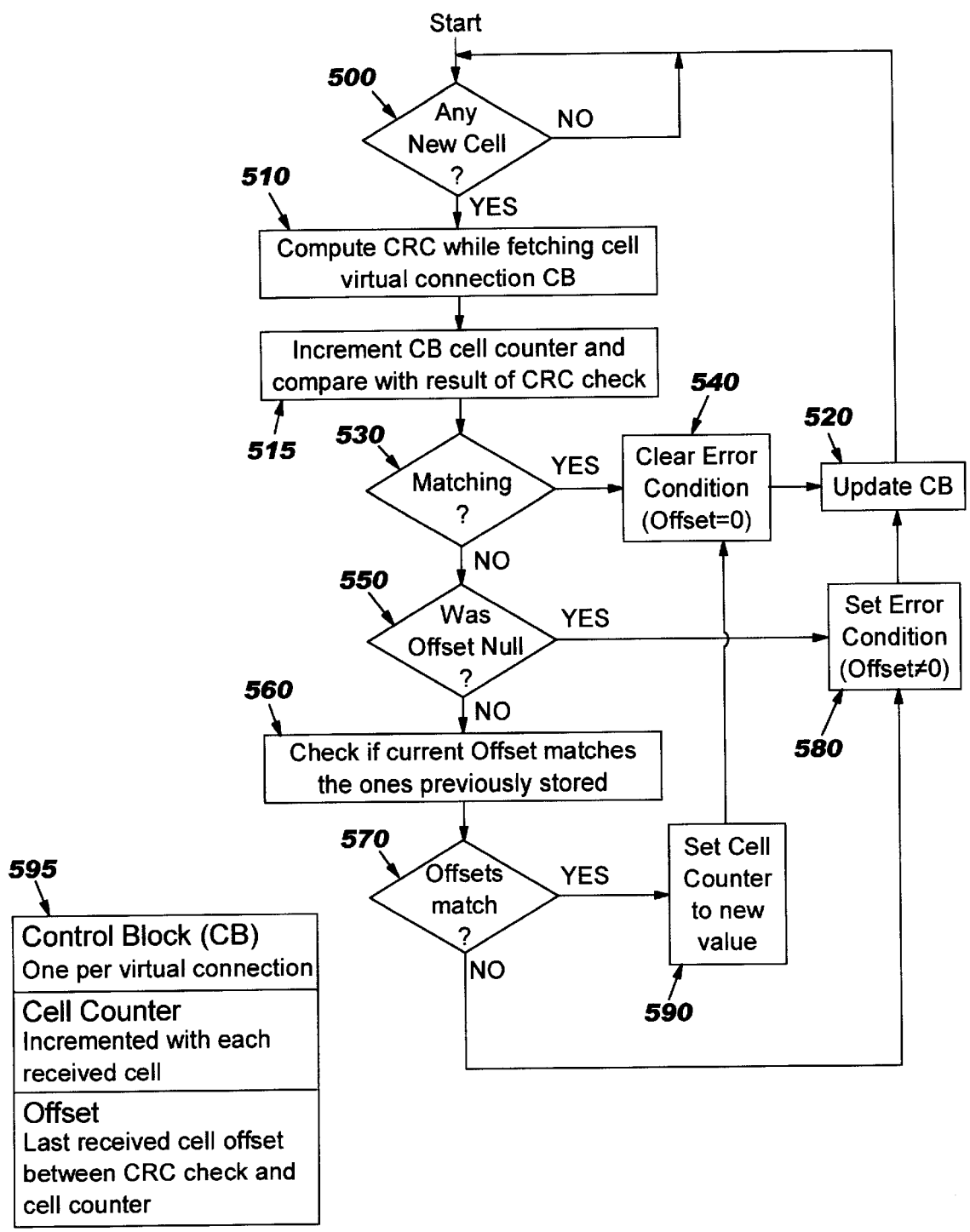
FIG. 5 is the flow chart of a process performed in output adapter to analyze switched cells for alterations and/or cell sequencing problems.

Scenario A is the normal case in which no error are detected. The matching legends indicate there has been no change detected in a protected field since the generation of the check field. Scenario B depicts the situation where the output adapter detects an error condition for a cell during processing through the switching fabric. By observing subsequently received cells, a determination can be made whether the error is a change confined to the cell currently in the output adapter or whether a cell sequencing problem exists. Scenario C shows the case where a cell has been dropped or lost through misrouting during processing through the switching fabric. If one or more cells fails to reach the output adapter, the count generated by outbound cell counter will be off (relative to the inbound cell count) by a value corresponding to the number of missing cells. The counts will eventually be resynchronized when situation has been recognized and acted on accordingly by the device in charge of managing the adapter. Scenario D represents the case where an extra cell appears on a virtual connection, either as a result of duplication of an existing cell being transported on the connection or the misrouting of a cell which is actually supposed to be transported on a different virtual connection. The end result of this scenario is similar to the end result of Scenario C in that outbound cell counter acquires a permanent positive offset reflecting the number of extra cells received. As with Scenario C, the counters will eventually be resynchronized when situation has been recognized and acted on accordingly by the device in charge of managing the adapter. Scenario E illustrates the situation where two cells have been swapped, probably the most common form of a cell sequencing problem. As with other error scenarios, a fault of some kind is immediately indicated and may be reported. In order to establish that the error is a cell sequencing problem rather than a cell change problem requires that additional cells further analyzed. Whether or not the additional processing is performed depends on the desired level of sophistication of error detection for the network FIG. 5 is a flow chart of a simple form of the checking process performed in the output adapter. The error detection process starts at step 500 where a periodic check is performed for new incoming cells. Whenever a new cell is received, a CRC calculation is undertaken at step 510 while the control block (CB) associated to the cell's virtual connection is fetched. When the CRC result and the fetched CB are ready, the Cell Counter field extracted from Control Block 595 is incremented by 1. The incremented field value is compared to the cell check field result. In the absence of error, the two values should match. Assuming a match, if an error condition flag is currently set as a result of earlier iterations of the process, the flag is cleared at step 540 and the CB is updated with a null offset and a new incremented value of the cell counter for that connection after which the process resumes at step 500.

If, however, the result of comparison 530 indicates a mismatch, the previous offset value from the fetched control block must be tested. If the result of test 550 indicates that the offset was previously null, this is a clear indication of a new error condition. An error condition flag is set at step 580 and CB updated at step 520 with the current observed value of the offset along with the incremented cell counter value. The process resumes at step 500 waiting for a next cell. If the offset was not null, indicating the existence of an error, the current offset is compared to previously generated offsets at step 560. A match between a current and a previous offset indicates that cells have been dropped from or improperly added to the virtual connection, with the algebraic sign of the compare indicating which of the two situations exists, but further indicates the situation has returned to normal. In this case, the cell counter must be updated to its new observed value 590, the error condition flag is cleared with offset reset to 0 at step 540 and the connection CB is updated.

It should be noted that this process is self clearing at initialization. If error reporting may be ignored for the first cells of a new established virtual connection, the just described mechanism will automatically reset the CB with no need to implement an initialization procedure. Finally, if the error flag is set and offsets still do not match at step 570 this is indicative of an error window in progress. Then, the error must be maintained at step 580 and CB updated with the new observed offset and incremented cell counter. In summary, an error condition is indicated as soon as CRC checking and incremented (fetched) cell counts no longer match while the error condition is cleared as soon as they again match or it is found that the offset is no longer changing.

What is claimed is:

1. For use at a node in a packet communication network, a method of modifying each packet to support subsequent detection of alterations in selected fields of the packet or packet sequencing errors, the method comprising the steps of:
   a. incrementing a current count maintained by a first packet connection counter;
   b. performing a Cyclical Redundancy Check (CRC) calculation on selected fields of the packet to obtain an initial check value;
   c. obtaining a final check value by modifying the initial check value as a function of the incremented count in the packet connection counter; and
   d. loading the final check value into a predetermined field in the packet.

2. A method as set forth in claim 1 wherein the obtaining step further comprises the step of exclusively OR'ing each bit of a binary representation of the incremented count with a corresponding bit of a binary representation of the initial check value.

3. A method as set forth in either claim 1 or 2 including the further step of storing a control block containing at least the incremented current count in said first packet connection counter.

4. For use at a node in a packet communication network, a method of testing a received packet for changes in selected fields of the packet where the packet includes a final check value generated in accordance with claim 3, said testing method comprising the steps of:

a. incrementing a current count maintained by a second packet connection counter;

b. performing a CRC calculation on the selected fields of the received packet to obtain an initial check result;

c. obtaining an offset value by comparing the initial check result with the incremented current count from the second packet connection counter;

e. if the offset value is anything other than null, setting an error flag to indicate the existence of an error condition; and f. storing incremented current count and the offset value in a control block.

5. A testing method as set forth in claim 4 including the following additional steps performed where the offset value is anything other than a null:

a. comparing the most recent offset value to the offset value for the previously processed packet;

b. where the result of the compare is null, setting a flag to indicate that the error condition is limited to the contents of the packet being tested; and c. where the result of the compare is a non-null value, setting a flag indicating the existence of a packet sequencing error.

6. For use in a node in a packet communication network, an apparatus for modifying each packet to support subsequent detection of alterations in selected fields of the packet or packet sequencing errors, said apparatus comprising:

a. a first packet connection counter which is incremented upon receipt of each packet to be processed for a network connection;

b. a Cyclical Redundancy Check (CRC) character generator which performs a CRC calculation on selected fields of each packet to yield an initial check value;

c. an adder element which obtains a final check value by modifing the initial check value as a function of the incremented count of said first packet connection counter; and d. packet generation logic for loading the final check value into a predetermined field in the packet.

7. An apparatus as set forth in claim 6 wherein the adder element comprises a set of exclusive OR devices, each having an input from said first packet connection counter and an input from said CRC character generator.

8. For use in a node in a packet communication network, an apparatus for testing a received packet for the presence of error conditions, said apparatus comprising:

a. a second packet connection counter which is incremented upon receipt of each packet to be tested for a network connection;

b. a Cyclical Redundancy Check (CRC) character generator which performs a CRC calculation on selected fields of each packet to yield an initial check result;

c. a comparator for comparing the initial check result to the incremented count from said second packet connection counter; and d. logic responsive to any non-null output from said comparator to set an error condition indicator.

9. Apparatus as set forth in claim 8 further including sequencing error detection logic comprising:

a. a memory element for storing the output of said comparator for each of a plurality of sequentially processed packets;

b. comparator logic for comparing the current output from said comparator to the stored output for the previously-processed packet; and c. logic responsive to the non-null result from the comparison for identifying a packet sequence error.

\* \* \* \* \*